Figure 1:
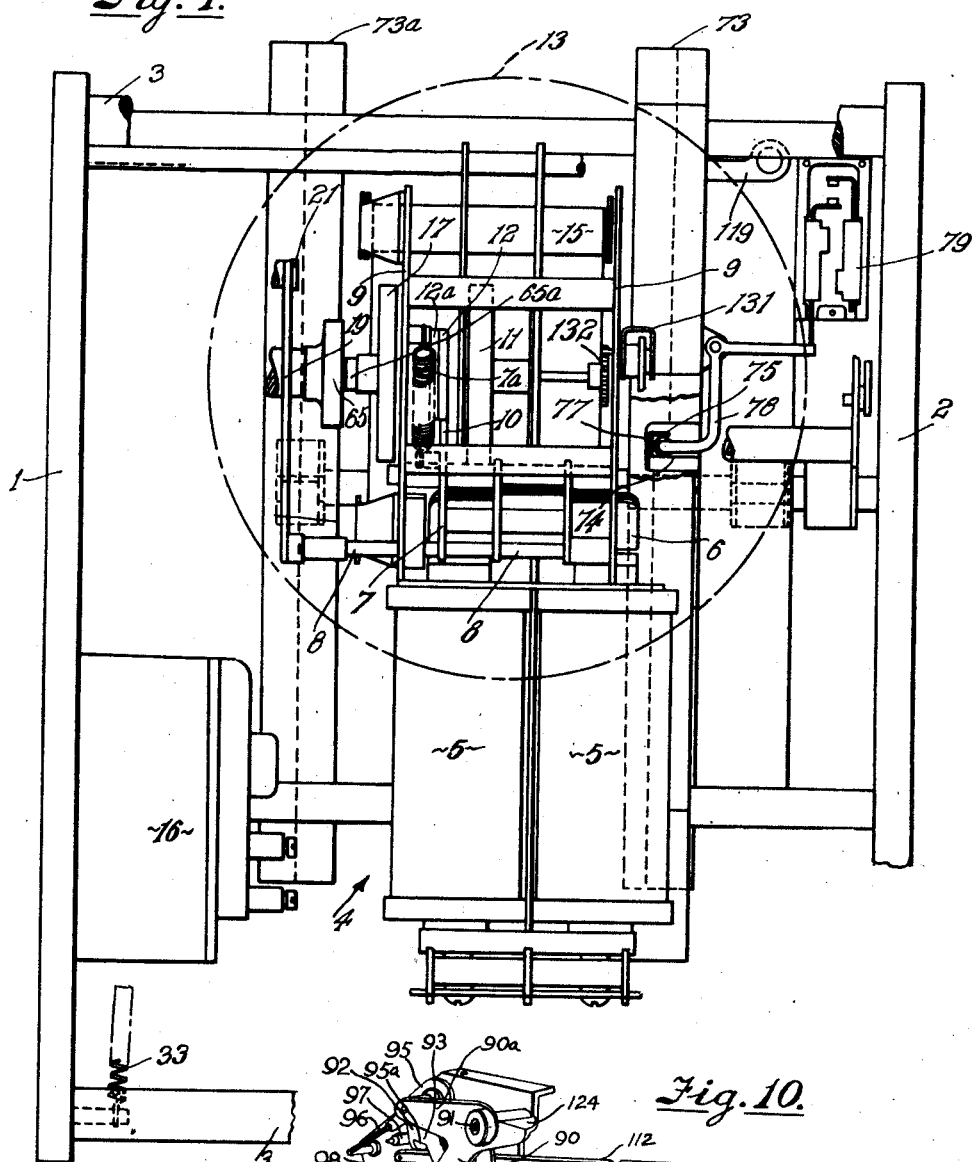

Nov. 7, 1944.     J. W. MOLDEN ET AL     2,362,392
TIMING MECHANISM
Filed July 18, 1939     5 Sheets-Sheet 1

INVENTORS
JOSEPH W. MOLDEN
ARTHUR B. WEBBER
BY Norris & Bateman
ATTORNEYS

Nov. 7, 1944.   J. W. MOLDEN ET AL   2,362,392
TIMING MECHANISM
Filed July 18, 1939   5 Sheets-Sheet 2

INVENTORS
JOSEPH W. MOLDEN
ARTHUR B. WEBBER
BY Norris & Bateman
ATTORNEYS

Nov. 7, 1944. J. W. MOLDEN ET AL 2,362,392
TIMING MECHANISM
Filed July 18, 1939 5 Sheets-Sheet 3
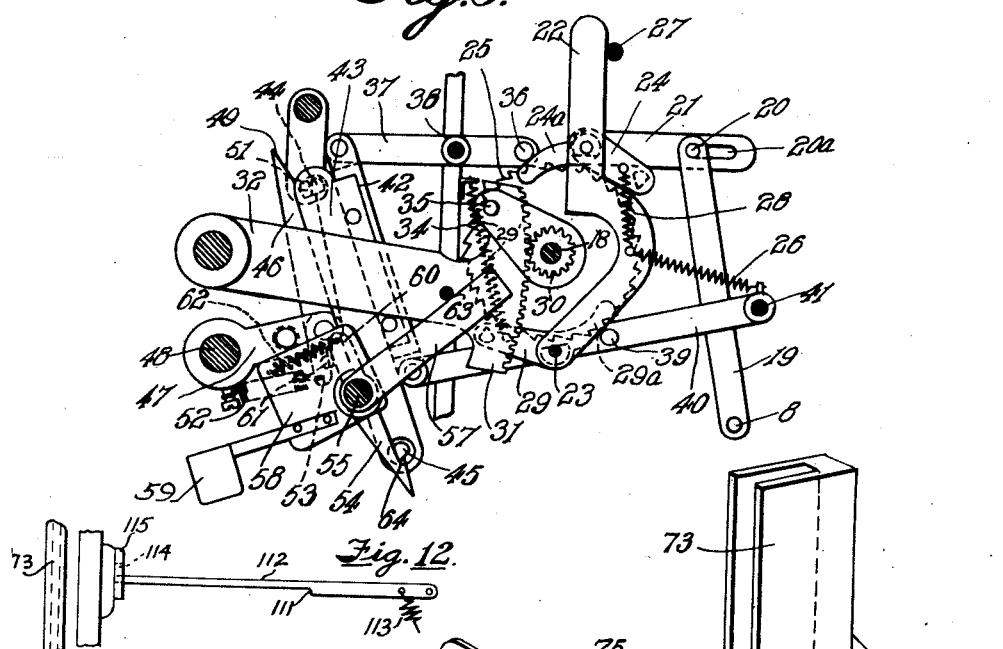
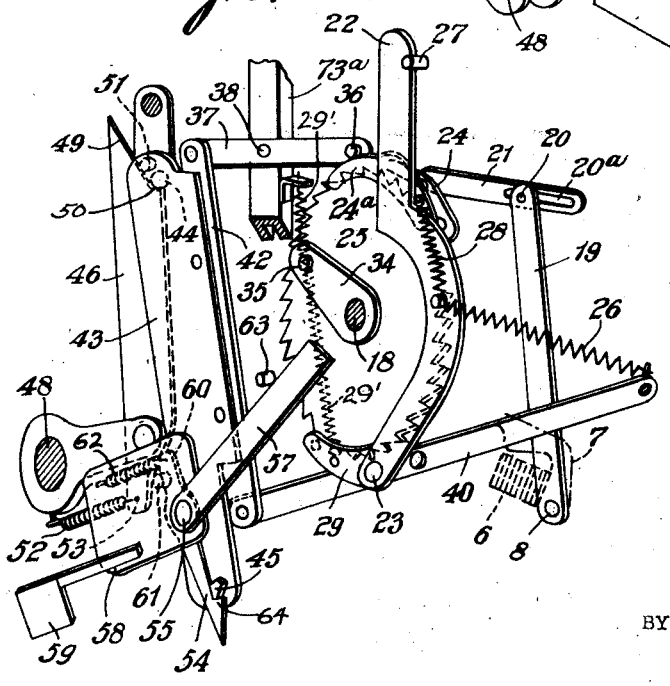
INVENTORS
JOSEPH W. MOLDEN
ARTHUR B. WEBBER
BY Norris & Bateman
ATTORNEYS Nov. 7, 1944.    J. W. MOLDEN ET AL    2,362,392
TIMING MECHANISM
Filed July 18, 1939    5 Sheets-Sheet 4
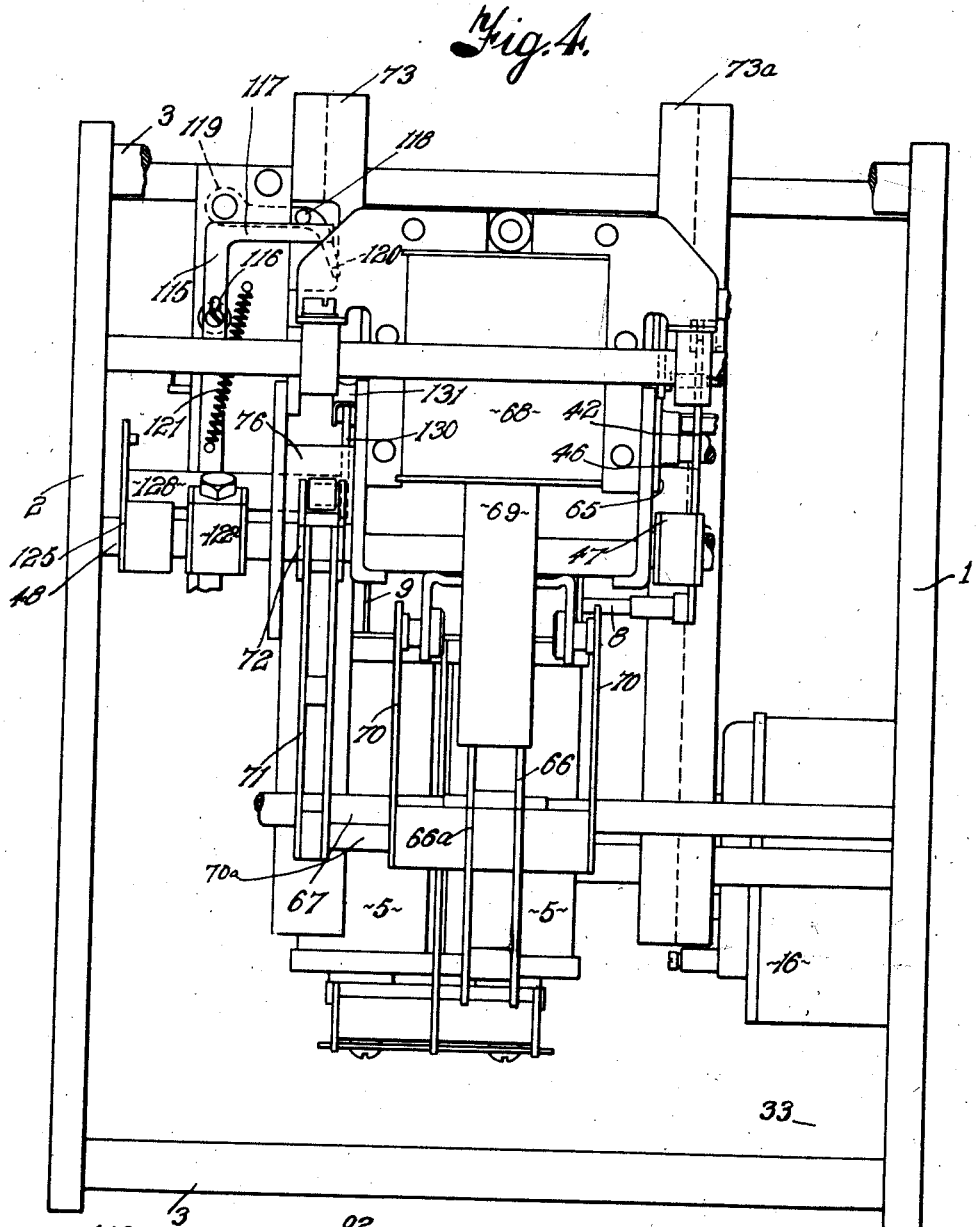
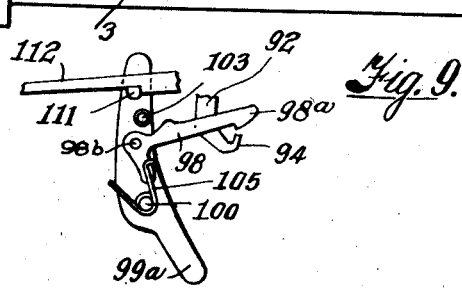
INVENTORS
JOSEPH W. MOLDEN
ARTHUR B. WEBBER
BY Norris & Bateman
ATTORNEYS INVENTORS
JOSEPH W. MOLDEN
ARTHUR B. WEBBER
BY Norris & Bateman
ATTORNEYS Patented Nov. 7, 1944

2,362,392

UNITED STATES PATENT OFFICE 2,362,392

TIMING MECHANISM

Joseph William Molden and Arthur Booth Webber, Westminster, England, assignors to The British Vacuum Cleaner & Engineering Company Limited, Leatherhead, Surrey, England, a British company Application July 18, 1939, Serial No. 285,184
In Great Britain July 23, 1938

7 Claims. (Cl. 234—2).

This invention relates to time recording mechanisms of the kind which are subjected to intermittent operation by hand for the purpose of recording the time at which various stages in any process or operation are completed.

As is known, the passage of vehicles of a public service past various control points along the route of the vehicles is recorded by devices located at each control point on cards identified with the vehicles and inserted in the devices as each control point is reached, and the invention has particular but not exclusive application to time recording devices of this character.

In mechanisms of the kind above described it is of considerable use and sometimes of importance to know the time interval between successive time recording operations effected with the mechanism, and it is the object of the present invention to provide an improved time recording mechanism from which such information may be obtained.

According to the invention in a time recording mechanism of the kind described there is provided a time indicating element, which shows at any moment the time interval which has elapsed since the last time recording operation.

The invention also comprises a time recording mechanism of the kind described in which there is provided an additional time registering element, an operative connection between said registering element and the clock movement or an equivalent time train, and means for zeroising said time registering element operable immediately after a time recording operation has been made, whereby said registering element produces, whenever the machine is operated, a record of the time interval which has elapsed since the last time recording operation.

Figure 10:
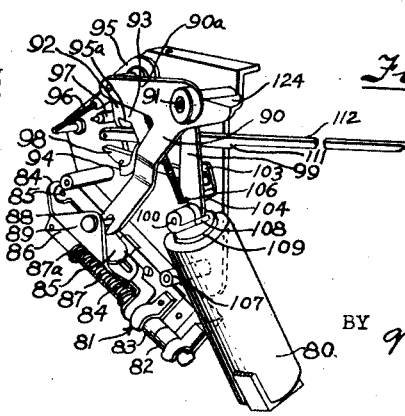
Figure 2:
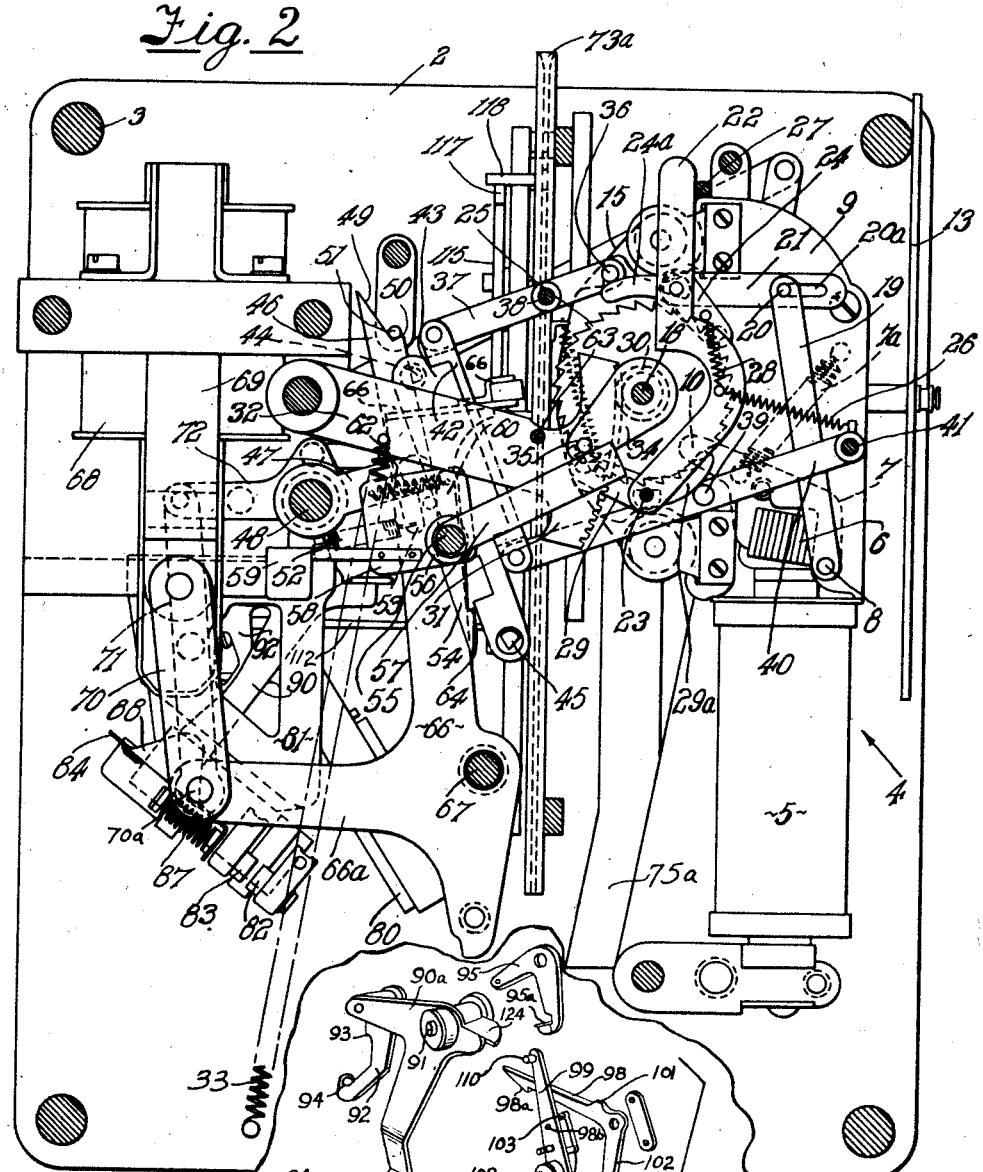
Figure 11:
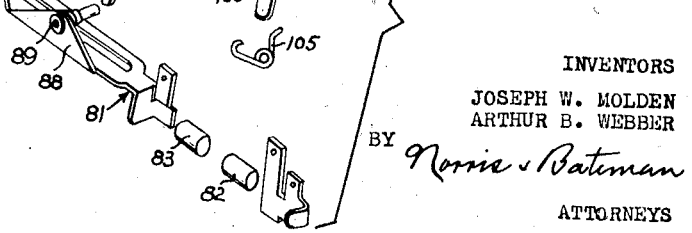
Figure 5:
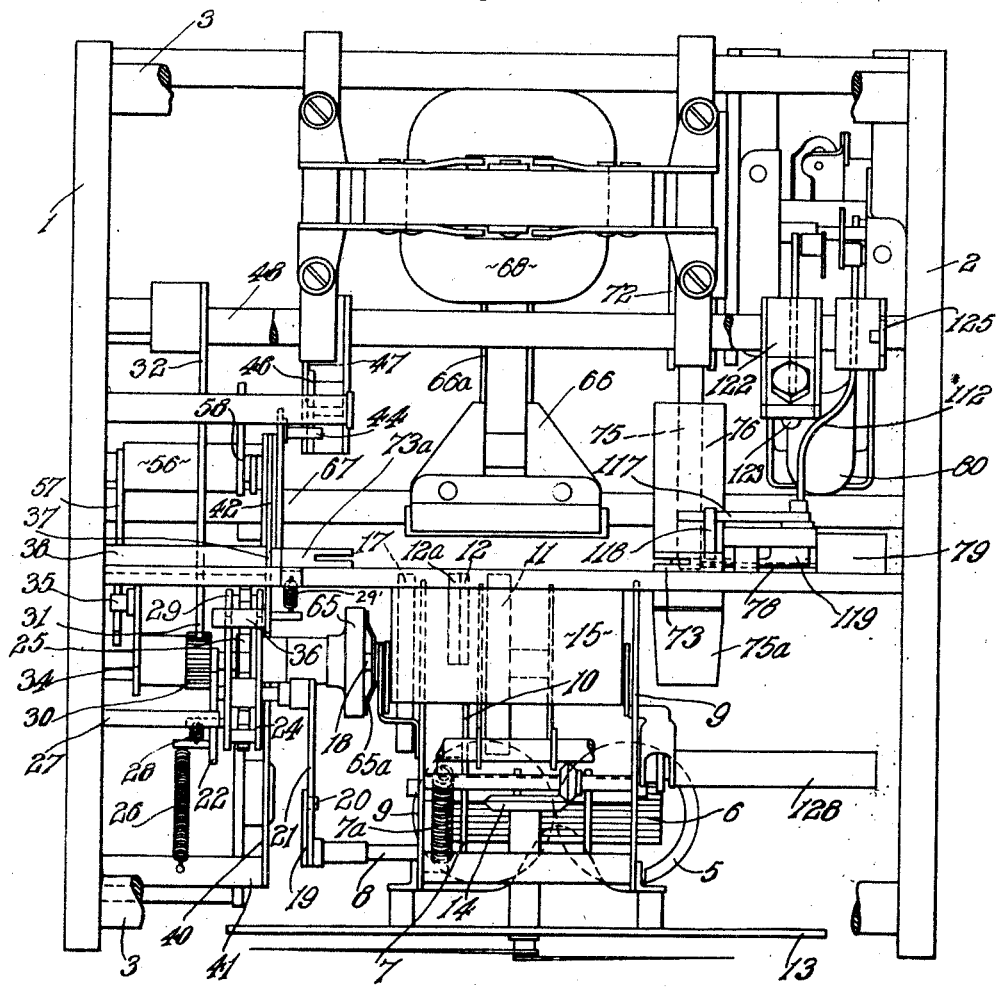
Figure 8:
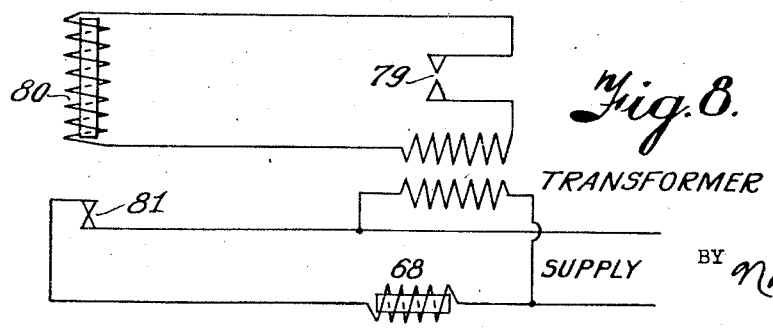

In order that the invention may be more fully understood, reference will now be made to the accompanying drawings which illustrate, by way of example, the application of the invention to a time recording mechanism of the kind used for recording the passage of public service vehicles past a control point, and wherein:

Figure 1 is a front view of the mechanism,

Figure 2 is a sectional side elevation, viewed from the left of Figure 1, with the side frame member removed, Figure 3 is a view in perspective showing the timing device zeroizing mechanism and associated parts, Figure 4 is a rear elevation of the mechanism, Figure 5 is a plan view of the mechanism, Figure 6 is a detail view showing the timing device zeroising mechanism in operation, Figure 7 is a perspective view illustrating the card-controlled actuating means for the switch mechanism, Figure 8 is a diagrammatic showing of the circuit of the mechanism, Figure 9 is a fragmental view of a part of the main switch structure, Figure 10 is a perspective view of the main switch structure and associated parts, Figure 11 is a perspective view of certain parts of Figure 10 disassociated to disclose details thereof, and Figure 12 is a fragmental elevational view showing the operative connection between the switch-locking arm and the coacting vertical bar.

In the drawings, particularly Figures 1–5, certain parts have been omitted from some of the views in order to avoid confusion but all elements necessary to an understanding of the invention are illustrated and appear in the views in which they can be shown with clarity.

In the drawings, 1 and 2 indicate two side plates or frame members between which the mechanism is supported and which are connected together by tie bars 3. Near the front of the framework there is supported an electrically-driven clock mechanism 4, comprising an electromagnet 5 which actuates an armature 6 carried by a frame 7 under control of a spring 7a and fixed on a shaft 8 oscillatably mounted in frame plates 9. An extension 10 of the frame 7, through pawl and ratchet mechanism (not shown), actuates an hour wheel 11, a tens-of-minutes wheel 12 and a minute wheel 12a, all in the form of printing wheels having hour, tens-of-minute and minute indications respectively inscribed on their peripheries. A face 13 of the clock mechanism, has hands driven by gearing 14 in operative connection with the printing wheel driving mechanism. An inked ribbon 15 mounted on spools carried at the upper and lower ends of the frame plates 9 is arranged to pass over the rear face of the printing mechanism, and is advanced after each printing operation by means hereinafter to be described.

The electromagnet 5 is energized periodically by time-controlled impulses derived from a mains-driven synchronous electric motor 16 which drives a cam adapted to close electric contacts in circuit with the electromagnet. Energisation of the electromagnet, which is effected at minute intervals, attracts the armature 6 thereby rocking the frame 7 and, through the pawl and ratchet mechanism previously mentioned, advances the printing wheels at their respective intervals.

The mechanism above described is of a known type used in time recorders and forms no part of the present invention which will now be described.

Mounted adjacent the frame 9 is a further printing wheel 17 aligned at its rearward face with the rearward faces of the printing wheels 11, 12 and 12a, said wheel 17 carrying minute indications on its periphery and being fast on a shaft 18 supported in the end plate 1 and frame plate 9. On an extension of the shaft 8 there is secured a crank arm 19, the upper end of which has a pin 20 engaging in a slot 20a, formed in a link 21, said link being connected to an arm 22 which is mounted on a fixed pivot 23 and carries a driving ratchet 24 engaging with a ratchet wheel 25 fast on the shaft 18. A spring 26 normally holds the arm 22 against a fixed stop 27 while a further spring 28 between the arm 22 and ratchet 24 holds the ratchet 24 in engagement with the ratchet wheel 25. A retaining ratchet or pawl 29 controlled by a spring 29' is also provided for the ratchet wheel, said ratchet or pawl 29 being mounted on the pivot 23. Upon rocking movement being imparted to the shaft 8 and crank arm 19, the pin 20 engages the inner end of the slot 20a, moves the link 21 inwardly and rocks the arm 22 advancing the ratchet 24 over the ratchet wheel 25 by one tooth. When the magnet armature 6 is released the spring-controlled armature frame 7 moves to its original position and the spring 26 moves the arm 22 back against the stop 27 during which movement the ratchet 24 drives the ratchet wheel 25 and thereby also the printing wheel 17. It will thus be seen that while the electric motor 16 is in operation the printing wheel 17 is rotated step by step at minute intervals, but when a printing operation is effected this wheel is zeroised, that is, returned to its initial position by the mechanism now to be described.

Also fast on the shaft 18 is a pinion 30 in mesh with a toothed sector 31 formed on the end of a pivoted arm 32 which, under the action of a tension spring 33 which is tensioned by the advancing movement of said shaft, returns the ratchet wheel 25 and associated printing wheel 17 to their initial position when the driving and retaining ratchets 24 and 29 are moved out of engagement with the ratchet wheel. The pinion 30 also carries an arm 34 provided with a lateral stop 35 for the purpose indicated hereafter.

The driving ratchet 24 is provided with a rearward extension 24a which is contacted by a pin 36 carried on one arm of a double-armed lever 37 pivotally mounted on a fixed stud 38 (see Fig. 3). The retaining ratchet 29 is also provided with a rearward extension 29a which is contacted by a pin 39 carried by a single-armed lever 40 pivotally mounted at one end on a fixed stud 41. The other arm of the lever 37 and the free end of the lever 40 are pivotally connected to the ends of a link 42 to which is attached a bar 43 carrying laterally projecting pins 44, 45 at its upper and lower ends respectively. Adjacent the upper end of the bar 43 is a latch 46 pivotally mounted on an arm 47 fast on a transverse shaft 48 which is rocked at each printing operation in a manner hereafter described. The latch 46 is formed with an oblique edge 49 which terminates in a lip 50 and is caused to bear against a fixed stop 51 by the action of a tension spring 52 connected to a lug 53 depending from the lower end of the latch. The forward rocking movement of the shaft 48 lowers the latch and brings the lip 50 beneath the pin 44 on the bar 43. The oblique edge 49 works against the fixed stop 51 so that on the return movement of the rock shaft the latch raises the bar 43 and, through levers 37 and 40, releases the ratchets 24, 29 allowing the printing wheel shaft 18 to zeroise, after which the lip 50 slips off the pin 44 and the latch is automatically reset. Figure 6 shows the position of the latch 46 at the moment when it is about to release the pin 44.

A further latch 54 is provided to co-operate with the pin 45 when the bar 43 is raised, to hold the bar in the raised position until the printing wheel shaft 18 has zeroised. The latch 54 is freely mounted on a stub shaft 55 on which there is also loosely mounted a sleeve 56 carrying a small arm 57 at one end and a plate 58 at the other end, said plate having fixed thereto a counterweight 59. The latch 54 is formed with a projecting lug 60 which is held against a stop 61 on the plate 58 by a tension spring 62 extending between said lug 60 and a pin fixed on the plate 58. When the machine is at rest in the position shown in Figure 1, the stop 35 on the pinion arm 34 bears upon the arm 57 and through sleeve 56, plate 58 and stop 61 holds the latch 54 in an inoperative position. Upon movement being imparted to the ratchet wheel 25 by the driving ratchet the stop 35 moves away allowing the arm 57 to rise under the action of the counterweight 59 into engagement with a fixed stop 63 and such movement allows the latch 54 to swing through an angle sufficient to bring it into the path of the pin 45. When the bar 43 is lifted by latch 46 to release the ratchet wheel 25, a lip 64 on the latch 54 engages under the pin 45 and holds the bar 43 in the raised position, see Figure 6. Shortly before the ratchet wheel 25 reaches its initial position the stop 35 on the pinion arm 34 engages and depresses the arm 57 whereby the plate 58 is rocked and the latch 54 is swung rearwardly away from under the pin 45 thus allowing the ratchet release mechanism to return to its original position.

To prevent rebound of the ratchet wheel 25 and printing wheel 17 at the end of the zeroising movement the shaft 18 is provided with a loosely carried flywheel 65 in frictional engagement with a spring spider 65a fast on the shaft. The momentum of the flywheel through the spring acts in opposition to the tendency of the ratchet wheel and associated mechanism to rebound from their zero position.

Co-operating with the printing wheels 11, 12, 12a and 17 is a printing hammer 66 oscillatably mounted about a fixed transverse shaft 67. The hammer is rocked by means of a solenoid 68, the moving core 69 of which is connected by pivotally-mounted links 70 to a rearwardly extending arm 66a of the hammer lever. Also mounted on the spindle 70a forming the connection between the links 70 and the arm 66a is one end of a link 71 the other end of which is attached to the horizontal arm of a bell-crank lever 72 fast on the rock shaft 48. It will thus be seen that when the solenoid is energised the core is lifted thereby oscillating the hammer clockwise (Fig. 2) so as to press the card against the type wheels and rocking the shaft 48, the elements being returned to their initial position when the core is released, either by the weight of the core alone or with the aid of additional weights or springs.

The card upon which time records are to be printed is adapted to be positioned immediately behind the printing wheels for engagement therewith by the printing hammer, and to this end there is provided a pair of slotted bars 73, 73a arranged to form a card chute open at the upper end. The extent to which a card can be inserted in the chute is automatically reset at each printing operation on that card so that successive printings on the card are effected in column formation. For this purpose the slot in the bar 73 is of greater depth along the upper portion than along the lower portion of the bar, the bases of the two slots being connected by a horizontal shoulder 74 which forms a card rest. Immediately above the shoulder 74 the bar 73 is formed with a transverse opening which is adapted to be traversed by a punch 75 (see Fig. 7). The punch is guided within a housing 76 and is pivotally attached at its rear end to the upper arm of the bell-crank lever 72 fast on the rock shaft 48 so that a horizontal reciprocation is imparted to the punch each time the shaft 48 is rocked. At each printing operation the punch removes a small section or chip from the edge of the card, said chip passing down a chute 75a to the base of the machine and being of a depth equal to the desired spacing of the printed recordings on the card and of a width such that the reduced portion of the card will pass down the lower portion of the chute. The card is thus prepared for a deeper setting within the card chute for the succeeding printing operation.

In the machine above described the printing operation is effected automatically by the insertion of a card in the card chute and for this purpose means are provided for closing the hammer-operating solenoid circuit when the card moves to its correct printing position and for opening said circuit after a printing operation has been effected and preventing repetitive operation of the mechanism. As can be seen from Figures 1 and 7, the punch 75 is of angle cross section, and arranged within an aperture in the slotted bar 73 and bordered by the punch is a roller 77 carried by one arm of a bell-crank lever 78 the other arm of which contacts the operating member of a switch 79, the arrangement being such that when a card is inserted in the chute the roller is moved outwardly thereby rocking the lever 78 and closing the switch. The switch 79 is adapted to close the circuit to a subsidiary solenoid 80 controlling a switch 81 (Figs. 2, 10 and 11) the contacts of which are in circuit with the hammer-operating solenoid 68. The switch 81 comprises fixed and moving carbon contacts 82, 83 respectively, the moving contact being carried by a plate 84 which is slotted and guided for longitudinal movement relative to the fixed contact upon pins 85 secured in a fixed bracket 86. A spring 87 extending between a lug 87a on the bracket 86 and a downturned end of the plate 84 upon which the contact 83 is mounted urges the contact 83 in a direction towards the fixed contact 82. The plate 84 is also formed with an upstanding flange 88 in which is mounted a pin 89 engaged by the forked end of a lever 90 oscillatably mounted on a pin 91 supported in the switch frame. The lever 90 is formed with a subsidiary arm 90a on the free end of which is pivoted a latch 92 shaped along one edge to form a shoulder 93 and offset laterally at its free end to form a catch 94. Pivotally mounted adjacent the latch 92 is a double-armed lever 95 one arm of which is offset forming a catch 95a for co-operation with the shoulder 93 of latch 92 while the other arm has connected thereto a spring 96 which urges it in a direction to bear against a fixed stop 97. Co-operating with the catch 94 is a release pawl 98 having detent 98a pivotally mounted at 98b on a lever 99 which is secured on a spindle 100 rotatably mounted in the switch frame. Oscillatory movement of the pawl 98 is limited by the engagement of abutments 101, 102 formed on the pawl with pins 103, 104 respectively mounted on the lever 99, the abutment 102 being normally held against the pin 104 by means of a coiled spring 105 surrounding the spindle 100 (Fig. 9). A tension spring 106 extending between pins on the latch 92 and lever 99 respectively urges the latch 92 into contact with the lever 95 and the lever 99 into a position to bring an extension 99a thereof to bear against a fixed pin 107. Also fast on the spindle 100 is a collar 108 to which is secured the armature 109 of the subsidiary solenoid 80 so that this armature moves with the lever 99.

On the upper end of the lever 99 is fixed a pin 110 (Figs. 9 and 11) which is adapted to co-operate with a detent or shoulder 111 (Fig. 12) formed on a switch-locking arm 112 pivoted at one end on the switch frame, a tension spring 113 being provided for urging the arm 112 downwardly against the pin 110. The free end of the arm 112 engages in a slot 114 (Fig. 12) formed in the lower end of a bar 115 which is mounted by means of pin and slot connections 116 upon the slotted bar 73 so that it can partake of limited vertical sliding movement. The upper end of the bar 115 (Figs. 4 and 5) has a horizontal extension 117 engaged by a pin 118 carried by a pivoted arm 119 the free end of which is bent downwardly to form a nose 120 and projects into the slot in the bar 73 so that when a card is inserted in the card chute the arm 119 is rocked, thereby depressing the bar 115 against the action of a spring 121.

The switch 81 operates in the following manner: Prior to the insertion of a card in the machine, the switch elements occupy the position in which the catch 95a is engaged under the shoulder 93 of latch 92, holding the lever 90 in a position in which the contact 83 is spaced from contact 82. Under those conditions detent 98a of pawl 98 is in engagement with the catch 94. The arm 112 is also held out of contact with the pin 110 by the bar 115 which is maintained in its raised position by spring 121. Insertion of a card first depresses bar 115 through arm 119 and pin 118 allowing arm 112 to move downwardly and bear upon pin 110, and then rocks lever 78 closing the switch 79 in the subsidiary solenoid circuit. As the solenoid 80 is energised rocking movement of the armature 109 rocks the lever 99 clockwise (Fig. 10) whereby pawl 98 engaging catch 94 withdraws the latch 92 to a position in which the shoulder 93 is clear of catch 95a, allowing the lever 90 and latch 92 to move downwardly around the pivot 91 and close the switch 81. The movement of the lever 99 brings the pin 110 opposite the detent 111 whereupon the arm 112 moves downwardly under the action of the spring 113 to hold the lever in this position. As previously mentioned, closure of the switch 81 energises the hammer solenoid 68 which effects the printing and punching operations. Immediately after the punch has removed a section from the edge of the card and returned to its initial position, the roller 77 moves back into the recessed portion of the bar 73 and the circuit to the subsidiary solenoid 80 is broken. The circuit employed is diagrammatically shown in Figure 8.

Mounted upon the rock shaft 48 is an arm 122 carrying a plunger 123 which, on the forward rocking movement of shaft 48, engages and depresses an extension 124 on the lever 90, thereby lifting the lever. When the shoulder 93 is brought above catch 95a, the catch is moved thereunder by the action of the spring 96 and the switch is thus reset. It will be noted, however, that when the switch is released to close the contacts, the latch 92 moves downwardly and forwardly so that, when the switch is reset as above described, the catch 94 moves up against the nose of the pawl 98, that is, in front of its detent 98a. The switch cannot therefore be tripped again until removal of the card from the machine allows the spring-pressed bar 115 to lift the arm 112 and so release the lever 99 which then moves to the operative position in which the detent 98a of pawl 98 engages over catch 94. By this means only one printing operation is effected at each insertion of a card.

As previously mentioned, the inked ribbon 15 is advanced after each printing operation, and in the machine described this is effected by any suitable means connected to an arm 125 fast on the rock shaft 48.

All the electrically operated devices are conveniently mains-energised with the use of transformers and/or rectifiers as desired, and to provide a clear understanding of the machine a complete cycle of operations will now be described.

With the electric motor 16 connected to a source of current supply, periodic impulses are conveyed to the electromagnet 5, thereby driving the clock 4 with associated printing wheels and simultaneously advancing the printing wheel 17, the position of which corresponds to the period which has elapsed since the previous timing operation. Insertion of a card in the chute 73, 73a first rocks the arm 119, releasing the switch-locking arm 112, and then, as its recessed edge is brought upon the shoulder 74, rocks the lever 78 and so closes the switch 79 in the subsidiary solenoid circuit. With the subsidiary solenoid 80 thus energised the attraction of the armature 109 trips the switch 81 and so closes the circuit to the hammer operating solenoid 68, whereby core 69 is lifted. Lifting of the core oscillates the hammer 66 to press the card against the printing wheels and also imparts a forward oscillation to the rock shaft 48. The forward rocking movement of the shaft 48 performs four operations, viz. it lowers the latch 46 into engagement with pin 44, advances the punch 75 and so removes a section from the edge of the card allowing roller 77 to move inwardly to open switch 79, moves the plunger 123 down upon the extension 124 of lever 99 thus resetting the switch 81 and breaking the hammer solenoid circuit, and advances the ribbon feeding gear (not disclosed). Immediately switch 81 is opened the rock shaft returns to its original position whereby latch 46 lifts pin 44, releasing ratchets 24, 29 and allowing ratchet wheel 25 and associated mechanism to zeroise, punch 75 and plunger 123 are returned to their initial positions, and the ink ribbon advanced. The printing operation having now been completed the card is removed from the machine whereupon the bar 115, rising under the action of spring 121, lifts the arm 112 thus allowing lever 99, and catch 94 to return to the initial position. All the parts are now in position for further operation to record the time interval from said zeroising movement on the insertion of the next card in the card chute.

It will be noted that when the ratchet wheel 25 is in a position to record the maximum time interval, that is, when it has completed slightly less than a complete revolution, the stop 35 on the pinion arm 34 is brought to bear against the underside of the arm 57 and further movement of the ratchet wheel is prevented, the pin 20 thereafter moving freely in the slot 20a of the link 21.

It will be understood that in use the mechanism described is enclosed within a suitable casing constructed to leave the clock face exposed and formed with a slot in its top wall through which a card may be inserted, with the aid of additional guiding means if desired, into the card chute.

We claim:

1. In a time recording mechanism for printing elapsed time upon a card, a printing device actuator; a solenoid for operating said actuator and having a primary circuit containing a switch; a second solenoid for closing said switch and having a secondary circuit containing a second switch; means automatically actuated by inserting a card in the machine for closing said second switch, so as to cause said second solenoid to close said first switch and effect operation of said first solenoid; and means, actuated by said first solenoid, for opening said first and second switches.

2. The mechanism defined in claim 1, wherein said means for automatically closing said second switch comprises a movable member engaged by a predetermined portion of the inserted card, and said means for opening said second switch comprises a punch mechanism for severing said predetermined portion of said card and allowing said member to move into switch-opening position.

3. The mechanism defined in claim 1, wherein said means for opening said first switch comprises a member actuated directly in accordance with movement of said first solenoid upon termination of printing actuator movement thereof.

4. In a time recording mechanism for printing upon a card, a printer-actuating solenoid embodying a circuit having a switch urged toward closed position by resilient means and having latch means for holding it in open position; tripping means actuated automatically upon insertion of a card in the machine for releasing said latch means and closing said circuit; means operated by said solenoid for automatically opening said switch at a predetermined time and latching the same in open position, and a second means operated by insertion of said card for preventing said tripping means from again being actuated so long as said card is in place in the machine.

5. The mechanism defined in claim 4, wherein said tripping means comprises a second solenoid contained in a circuit automatically controlled by insertion of a card in the machine.

6. The mechanism defined in claim 4, wherein said last-named means comprises a member controlled by insertion of a card in the machine and is operable to prevent said tripping means from moving into tripping position.

7. The mechanism defined in claim 4, wherein said tripping means comprises a movable member and said last-named means comprises a latch element, automatically controlled by insertion of a card in the machine, and coacting in abutting relationship with said member for preventing the latter from moving into latch-means-tripping position.

JOSEPH WILLIAM MOLDEN.
ARTHUR BOOTH WEBBER.